United States Patent [19]

Kojoh et al.

[11] Patent Number: 4,983,337
[45] Date of Patent: Jan. 8, 1991

[54] METHOD AND APPARATUS FOR PRODUCING STRETCHED FILM

[75] Inventors: Hisashi Kojoh; Naoya Yamaguchi, both of Yatsushiro; Kazuhiro Tomoda, Hida; Tomoji Mizutani, Yatsushiro, all of Japan

[73] Assignee: Kohjin Co., Ltd., Tokyo, Japan

[21] Appl. No.: 381,713

[22] PCT Filed: Nov. 12, 1988

[86] PCT No.: PCT/JP88/01143
§ 371 Date: Jun. 30, 1989
§ 102(e) Date: Jun. 30, 1989

[87] PCT Pub. No.: WO89/04244
PCT Pub. Date: May 18, 1989

[30] Foreign Application Priority Data

Nov. 12, 1987 [JP] Japan .................. 62-284191

[51] Int. Cl.$^5$ ............................................. B29C 55/28
[52] U.S. Cl. ...................................... 264/41; 264/146; 264/209.5; 264/564; 425/141; 425/302.1; 425/305.1; 425/326.1; 425/367
[58] Field of Search .......... 264/41, 146, 159, 209.5, 264/210.2, 564; 425/72.1, 135, 141, 142, 302.1, 305.1, 326.1, 367

[56] References Cited

U.S. PATENT DOCUMENTS 3,291,876 12/1966 Justus .
4,138,453 2/1979 Segl, Jr. .
4,270,891 6/1981 Hopper .................. 425/302.1 X
4,682,941 7/1987 Upmeier et al. ............... 425/72.1
4,869,863 9/1989 Iwai et al. .................... 264/564

FOREIGN PATENT DOCUMENTS 1133536 8/1957 Fed. Rep. of Germany .
1282813 12/1961 France .
333727 5/1958 Japan .
52-13562 2/1977 Japan ...................... 264/146
52-10155 3/1977 Japan ...................... 264/567
54-139965 10/1979 Japan .
56-129138 10/1981 Japan .
60-215034 10/1985 Japan ...................... 264/564
62-191121 8/1987 Japan .
63-120632 5/1988 Japan .

OTHER PUBLICATIONS

Patent Abstracts of Japan, vol. 4, No. 7 (C-70), Jan. 19, 1980, p. 18 C 70.

Primary Examiner—Jeffery Thurlow
Assistant Examiner—Leo B. Tentoni
Attorney, Agent, or Firm—Armstrong, Nikaido, Marmelstein, Kubovcik, & Murray

[57] ABSTRACT

This invention relates to a tubular stretching method for producing a stretched film by passing a tubular thermoplastic resin film between pairs of nip rolls having mutually different peripheral speeds and by inflating the tubular film with internal pressure under heating and a stretching apparatus to be employed therefor. The pairs of nip rolls include at least three pairs of nip rolls. Pressurized air is admitted into a stretched bubble situated between the first and second rolls through a slit-like air injecting nozzle, and the bubble formed by the supplied pressurized air is inflated and stretched under heating. In this stage, if desired, the amount of injected pressurized air is controlled by manual or automatic control by detecting the diameter of the bubble so as to keep the bubble's diameter constant. After stretching, the tubular film is collapsed and is introduced to the second nip rolls. Both side ends of the collapsed film are cut open with film cutting knives to make two sheets of flat films. Then, the flat films are introduced to left and right guide rolls so as to avoid interference with the slit-like injecting nozzle and the cutting knives. Finally, the films are drawn with third nip rolls. In the apparatus of the present invention, the diameter and internal pressure of the bubble can be controlled with manual or automatic control even during tubular stretching, and particularly, the apparatus can be suitable applied to tubular stretching of porous films.

8 Claims, 5 Drawing Sheets

METHOD AND APPARATUS FOR PRODUCING STRETCHED FILM

TECHNICAL FIELD

The present invention relates to a method and apparatus for producing stretched film by heating and stretching a thermoplastic resin tubular film, and more particularly, to the method and apparatus suitably employed in production of a tubular stretched film having a bubble portion which is gas permeable.

BACKGROUND ART

Generally, a tubular biaxial stretched film is produced by first passing a tubular non-stretched film through two pairs of nip rolls. The tubular non-stretched film is then heated to a predetermined temperature with a heater attached in a zone between the two pairs of nip rolls. Pressurized air is admitted to form a bubble. The film is then drawn so as to pass through a group of collapser rolls with a pair of lower nip rolls.

The pressurized air is, in general, admitted only at the start. After a bubble having a predetermined size is formed, a fixed quantity of pressurized air is kept in the bubble by shutting the lower nip rolls, and the stretching is continued.

However, in the above-mentioned method for producing biaxial stretched film where the air is trapped to keep the bubble, the bubble gradually becomes deflated since during the stretching process, the pressurized air (small quantity) leaks out through the upper or lower nip roll portions. Therefore, an opening angle of the group of collapser nip rolls is adjusted so that the lateral magnification is suitably kept without dropping. However, in some cases, even though the opening angle of the collapser nip rolls is adjusted, the adjustment provides merely a change of stretching point and does not contribute to increase the transverse magnification. Further, when the start-operation cannot provide the predetermined size of the bubble, it is necessary to repeat the start-operation again, and the repetition is problematic. Particularly, in a case where gas permeable film is used, though the upper and lower nip rolls are shut so as to exclose the pressurized air in the bubble, the interior air leaks through the film face. Then, the bubble adjusted to the predetermined size becomes gradually deflated, and the biaxial stretching process cannot be continued.

As a measure against those problems, there have been conventionally proposed methods where pressurized air is continuously admitted in the bubble, for example, as disclosed in Japanese Examined Patent Publication No. 3727/1958, Japanese Unexamined Patent Publication No. 139965/1979, and the like.

For example, Japanese Examined Patent Publication No. 3727/1958 etc. discloses an apparatus having lower nip rolls provided with a continuous annular groove and a method to supply pressurized air through a tubular insert member by inserting the insert member into the groove. However, the film is easily deformed with frictional force when the tubular insert member comes in contact with the film. Moreover, a portion of the film which is saved from contact and is pinched and drawn by the nip rolls receives transverse stretching according to the diameter of the tubular insert member. Therefore, uniformity of the film decreases, the flatness of the film descends, and the like.

On the other hand, the above-mentioned Japanese Unexamined Patent Publication No. 139965/1979 discloses a method where the film is cut at a position just above the lower nip rolls and pressurized air is admitted through an air injecting nozzle inserted into the cut portion. However, the method's disadvantage is that puncture of the bubble easily happens, since the film is cut after the bubble is formed. Particularly, in such a film that resistance to tearing is poor, it is impossible to continue the stretching since the torn portion will extend widely.

DISCLOSURE OF INVENTION

The present invention was obtained as a result of study to eliminate the above-mentioned drawbacks. That is, the present invention relates to a method for producing a stretched film by passing a tubular thermoplastic resin film between pairs of nip rolls having mutually different peripheral speeds and by inflating an obtained bubble with internal pressure under heating, in which pressurized air can be continuously supplied in the bubble through a slit-like nozzle, and to an apparatus employed in the method.

The nip rolls comprise at least three pairs of nip rolls designated with R1, R2 and R3, respectively, and when the peripheral speeds of the pairs of nip rolls R1, R2 and R3 are designated as r1, r2, r3, the ratio r1/r2/r3 can be adjusted in a range of 0.1 through 0.8/1 through 1.1.

R1 is a pair of nip rolls situated at an introducing side of a non-stretched tubular film.

R2 is a pair of nip rolls situated at an end of a collapser stage after tubularly stretching.

R3 is a pair of drawing nip rolls continuing after the end of the collapser stage.

Pressurized air, if required, has a controlled flow rate in order to keep the diameter of the bubble at a determined value with manual or automatic operation through sensing the diameter of the bubble. The pressurized air is admitted into the stretched bubble between the R1 and R2 rolls through a slit-like pressurized air injecting nozzle provided in a gap between the pair of rolls R2. After the bubble, formed by the supplied air, is inflated and stretched under heating, the film is collapsed with a collapser device and is introduced to the nip rolls R2. Both side ends of the collapsed film are cut open with film cutting knives positioned between the pair of nip rolls R2 to make two flat sheet films. After the flat sheet films are introduced to left and right guide rolls to avoid the slit-like injecting nozzle and the cutting knives, the films are drawn by the nip rolls R3.

According to the method and apparatus of the present invention, the internal pressure of the bubble can be adjusted during the stretching occasionally or automatically, and therefore, even if the film is gas permeable, the film can be suitably stretched in a tubular form.

BEST MODE FOR CARRYING OUT THE INVENTION

Figure 1:
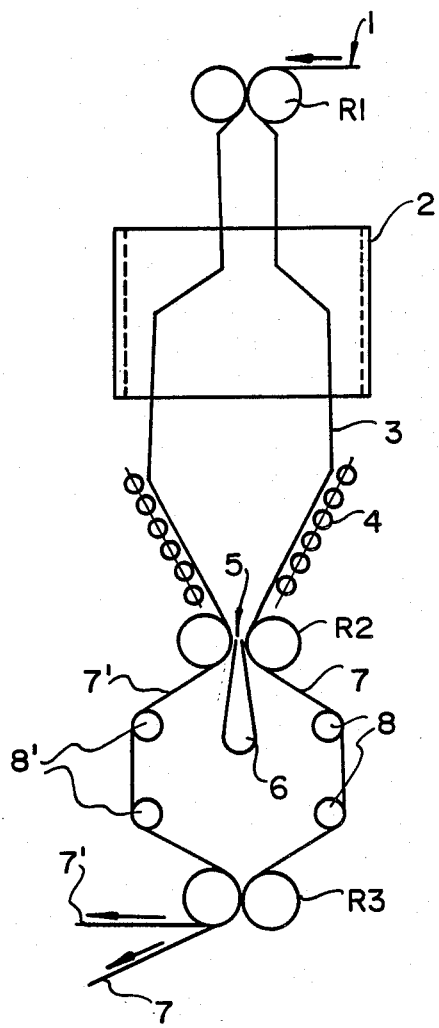
FIG. 1 is a diagrammatic elevational view showing an embodiment of the apparatus of the present invention and illustrating a process for heating, inflating and stretching a tubular non-stretched film.

The inventors have obtained the present invention as a result of a study to eliminate the above-mentioned drawbacks.

That is, the present invention relates to a method for producing a stretched film by passing a tubular thermoplastic resin film into pairs of nip rolls having mutually different peripheral speeds and by inflating the film with internal pressure under heating.

The pairs of nip rolls comprise at least three pairs of nip rolls designated with R1, R2 and R3, respectively. When peripheral speeds of the pairs of nip rolls R1, R2 and R3 are designated as r1, r2 and r3, the ratio of r1/r2/r3 can be adjusted in a range of 0.1 through 0.8/1/1 through 1.1.

R1 is a pair of nip rolls situated at an introducing side of the non-stretched tubular film.

R2 is a pair of nip rolls situated at an end of a collapser stage after tubular stretching.

R3 is a pair of drawing nip rolls continuing after the end of the collapser stage.

Pressurized air is controlled in flow rate in order to keep the diameter of the bubble at a determined value with manual or automatic operation through sensing the diameter of the bubble. The pressurized air is admitted into the stretched bubble between the R1 and R2 rolls through a slit-like air injecting nozzle provided in a gap between the pair of rolls R2. After the bubble formed by the supplied air is inflated and stretched under heating, the film is collapsed with a collapser device and is introduced to the nip rolls R2. Both side ends of the collapsed film are cut open with film cutting knives positioned between the pair of nip rolls R2 to make two flat sheet films. After the flat sheet films are introduced to left and right guide rolls to avoid the slit-like injecting nozzle and the cutting knives, the films are drawn by the nip rolls R3.

According to the method and apparatus of the present invention, the internal pressure of the bubble can be adjusted manually or automatically during the tube-stretching, and therefore, even if the film is a porous film, the film can be suitably stretched into a tubular form.

The present invention will be explained in detail hereinafter. It is to be understood that FIGS. 1 through 7 show only embodiments of the present invention, and the present invention is not limited to those embodiments.

Each reference number in the drawings means the part mentioned hereinafter.
R1: first nip rolls
R2: second nip rolls
R3: third nip rolls
1: a non-stretched tubular film
2: a heater
3: a stretched bubble
4: a group of collapser rolls
5, 5': a cutting knife
6: an air injecting nozzle
7, 7': a stretched flat film
8, 8': a guide roll
9, 9': a cutting knife holder
10': an air-sealing bar
11, 11': a motor for actuating a knife holder
12: an air inlet pipe
13, 13': a screwed rotary shaft
14: an air injecting nozzle device
15, 15': a bubble diameter detector
16, 16': a screwed movable member
17, 17': a bearing
18, 18': a bar for supporting a cutting knife holder
19, 19': a bracket
20, 23: an optical fiber
21, 22: a photoelectric switch
24, 24': a bracket for attaching a photoelectric switch 21, 22
25: an output controller
26: an automatic air supplying valve
27: an air supplying blower As shown in the attached drawings (FIGS. 1 through 7), the apparatus of the present invention is an apparatus for producing stretched films by passing a tubular thermoplastic resin film into pairs of nip rolls having mutually different peripheral speeds and by inflating the film with internal pressure under heating.

A heater 2 for heating the introduced tubular film 4 between the R1 and R2 rolls is provided, and a device 4 for collapsing the stretched film is provided between R1 and R2 rolls. The gap of the nip rolls R2 is adjustable, and a slit-like air injecting nozzle device 6 for injecting air into the bubble is provided in the gap. Two film cutting knife devices 5, 5' movable in a longitudinal direction of the nip rolls R2 are provided in the gap in order to cut both side ends of the collapsed film. At least one or more guide rollers 8, 8' guide the cut films 7, 7' to make each film's path avoid the slit-like nozzle device and the cutting knife devices for each flat film 7, 7'.

Figure 3:
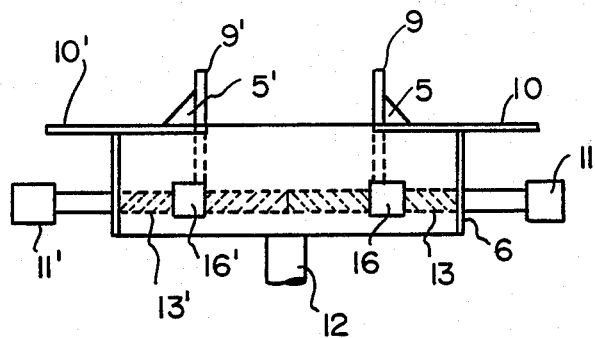
FIG. 3 is a diagrammatic front view showing an embodiment of an air injecting nozzle device and cutting knife devices, where the film cutting knife devices are provided in a gap of a slit-like air injecting nozzle device.
Figure 6:
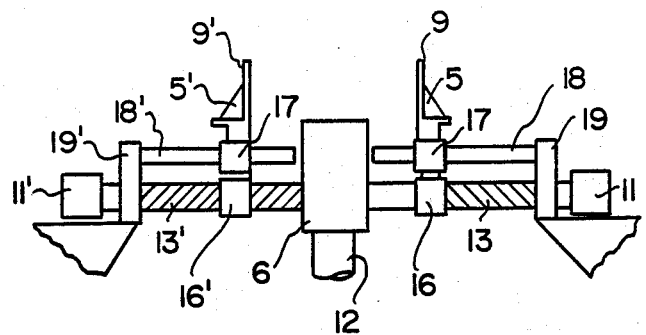
FIG. 6 is a diagrammatic front view of an embodiment of an air injecting nozzle device and cutting knife devices, where the film cutting knife devices are provided at both side ends of the nip rolls with respect to the slit-like air injecting nozzle device.
Figure 7:
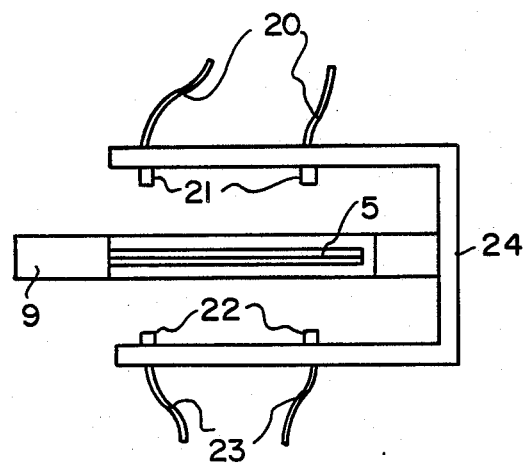
FIG. 7 is a diagrammatic plan view of an embodiment of a photoelectric switch in a cutting knife portion.
Figure 2:
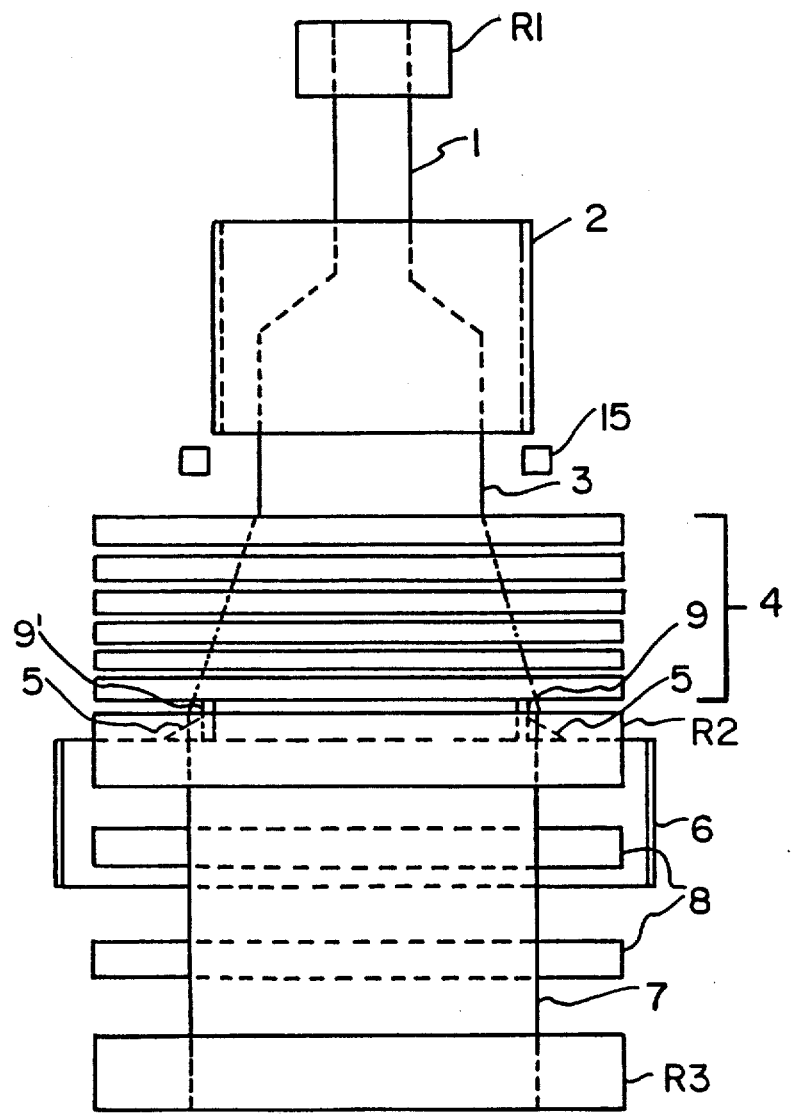
Figure 6:
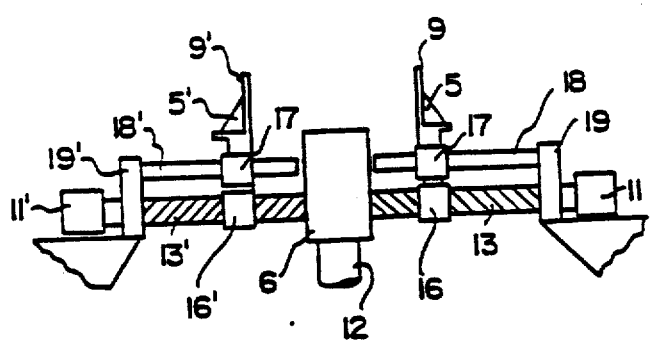

The above-mentioned air injecting nozzle device 14 comprises, as shown in FIGS. 3 and 6, an air injecting nozzle 6 and an air inlet pipe 12. The nozzle 6 supplies pressurized air to the bubble 3 through the gap of the nip rolls R2.

The flow rate and pressure of the injected air or bubble diameter are suitably detected. It is preferable to employ a bubble diameter detector 15, 15', and output controller 25, an automatic air supplying valve 26 and an air supplying blower 26 in order to change the amount of the supplied air so as to keep the diameter of the bubble to a predetermined value.

The above-mentioned cutting knife devices comprise, as shown in FIGS. 3 and 6, rotary shafts 13 combined with motors 11, 11' and having left-handed and right-handed screws thereon. Knife holders 9, 9' are provided on movable members 16, 16' capable of axially moving due to female screws engaged with the male screws of the rotary shafts 13, 13'. Cutting knives 5, 5' are fixed on the knife holders 9, 9'.

Figure 4:
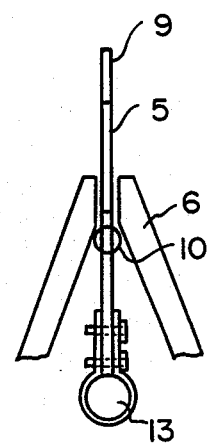
FIG. 4 is a diagrammatic side elevational view of the construction shown in FIG. 3.
Figure 5:
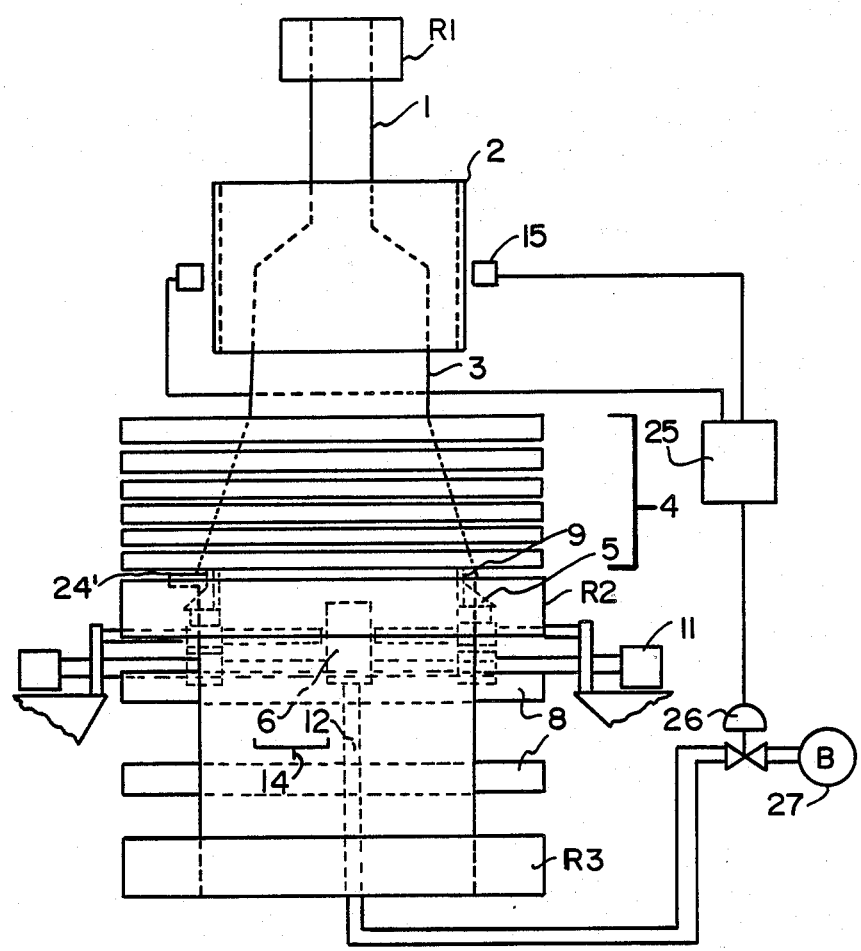
FIG. 5 is a side view of the device of FIG. 1, where film cutting knife devices are provided at both outer sides of the nip rolls with respect to the slit-like air injecting nozzle device.

In FIG. 3, and as shown in FIG. 4, air sealing bars 10, 10' are provided in the knife devices so that air does not leak out of the gap between the nozzle portion and the knife holders. In FIG. 6, bars 18, 18' for supporting the cutting knife holders are included in the cutting knife devices.

The nip rolls R1 function to seal the pressurized air, injected through the air injecting nozzle 6 from the R2 portion of the tubular film, to prevent upward leakage, and are driven at a peripheral speed of 0.1 through 0.8 times of the peripheral speed of the nip rolls R2. The ratio of the peripheral speeds is to be determined according to the required longitudinal stretching magnification. For example, if four times longitudinal magnification is required, the peripheral speed is to be adjusted to 0.25 times of that of the nip rolls R2.

The gap between the pair of rolls of the nip rolls R2 can be adjusted to an extent where an air injecting nozzle 6 can be arranged between the gap, for example from 1 through 10 mm in FIG. 3. However, in FIG. 6, any size of nozzle can be employed so far as the bubble is supplied with sufficient amount of pressurized air through the nozzle.

The nip rolls R3 have a function to draw the two films cut with the cutting knives 5, and are driven with 1 through 1.1 in peripheral speed ratio with respect to that of the nip rolls R2. Fundamentally, the nip rolls R2 and the nip rolls R3 can have the same peripheral speed. However, when the films are drawn, in some cases, the films become loosened due to the load of the guide rollers 8, 8' or the like. Such a problem can be eliminated by increasing the peripheral speed of the nip rolls R3 in order to tension the films.

If required, two pairs of nip rolls R3 can be employed so that each pair can draw each cut flat film 7, 7'.

The slit-like air injecting nozzle 6 is set in the gap of the nip rolls R2 so that the nozzle end is situated on a line which includes the axes of two rolls of the nip rolls R2. The nozzle 6 has a function to admit pressurized air into the stretched bubble in accordance with amount of air leak from the cut portions or the like in order to keep the bubble in a predetermined size. The nozzle 6 can be freely adjusted upward or downward with respect to the position of the nip rolls R2.

Further, the width of the slit-like air injecting nozzle 6 (in the direction of the length of the rolls) can be suitably selected. However, in FIG. 3 where the film cutting knife devices are provided in the gap of the nozzle 6, the width is generally set to an extent equal to the length of nip rolls or somewhat larger. In FIG. 6 where in the knife device for cutting film is arranged at both ends of the nip rolls with respect to the slit-like air injecting device, the width of the nozzle 6 in the direction of the length of the rolls is set to such an extent that the knives can enter the width of the collapsed non-stretched tubular film to be stretched when the distance between the knives is adjusted in the narrowest state.

As a means to move the knives 5, 5', for example, there can be employed a mechanism comprising a rotary shaft 13 having a left-handed screw portion and a right-handed screw portion on each half of the shaft provided in the slit-like air injecting nozzle 6. A pair of knife holders 9 each have a female screw portion engageable with the corresponding male screw. A pair of knives are held on the knife holder 9. The pair of knives 5 can be symmetrically moved along the rotary shaft 13 by rotating the shaft 13 driven by electric motor 11. Of course, the rotary shaft 13 can be separated at the center thereof into the left and right halves 13, 13' each jointed with an electric motor 11, 11' respectively, in order to drive the cutting knives independently of each other.

On the other hand, as shown in FIG. 6, when the width of the slit-like air injecting nozzle 6 is narrower than the width of the non-stretched tubular film in a collapsed state, the knives 5, 5' and the knife holders 9, 9' holding the knives 5, 5' are situated at both sides of the nozzle 6 and are fixed on a frame of the stretching machine or the like by means of brackets 19, 19'. In the same manner as mentioned above, the cutting knives 5, 5' can be moved in the axial direction of the nip rolls R2 by rotating the rotary shaft 13 with the electric motor 11 or the like. Then, even though the width of the tubular film in a collapsed state changes during stretching, both side ends of the film can be cut with the knives.

In this case, each knife-holder 9, 9' is mounted on a supporting bar 18, 18' so that the holders 9, 9' is not rotated together with the rotation of the rotary shaft 13. In this case, bearings 17, 17' are preferably employed so that the holders 9, 9' can smoothly move in the longitudinal direction of the nip rolls R2.

When the positions of the knife holders are automatically adjustable by mounting a photoelectric switch through brackets 24, 24', the cutting width of both side ends of the collapsed film can be automatically adjusted. The photoelectric switch in the embodiment comprises a photo-ejector 21 for ejecting rays guided by an optical fiber 20, a photo-receiver 22 for receiving the rays, an optical fiber 23 and a relay.

When the width of the film becomes narrower and the inside photoelectric switch, which has been intercepted by the film, receives the rays, the switch of the motors 11, 11' turns "ON" to rotate the shafts 13, so that the knife holders move inwardly.

When the width of the film becomes wider and the outside photoelectric switch, which has received the rays, is intercepted by the film, the switch of the motors 11, 11' turns ON to rotate the rotary shaft 13, 13' in the direction opposite to the above-mentioned direction. Then, the knife holders are moved outwardly.

That is to say, the knife holders are moved so that the side ends of the collapsed film are always positioned in an area between the inside and outside photoelectric switches without deviating from the area of width of the cutting knife. Then, the cutting is continued automatically.

In FIG. 3 where the slit-like air injecting nozzle 6 is wider than the width of the collapsed film at the nip rolls R2, there is no stretched bubble to be inflated at the area out of the cutting knives 5, 5'. Then, pressurized air is uselessly exhausted to the outside air. Such useless exhaust out of the bubble can be reduced by providing cylindrical air sealing bars or air ejection control bars 10 each having a diameter larger than the nozzle gap of the slit-like nozzle 6 and having a length almost half of the width of the nozzle 6. The bars 10 are located at the left and right outside positions of the knife-holders 9, 9' and under the slit portion of the inside of the slit-like nozzle 6.

In a preferable case, the air ejection control bars 10, 10' are connected with the knife holders 9, 9' so that the control bars 10, 10' can be moved together with the cutting knife holders 9, 9'.

By employing bubble diameter detectors 15, 15' on the lower portion of the bubble, to automatically detect the width of the collapsed tubular film 3 to be cut and by moving the cutting knives 5 in relation to the detected width of the film, the device can be automatically adjusted. In addition, by interlocking the flow rate of the supplied air with the stretched bubble's diameter detected by the above-mentioned detectors 15, 15', the range of the fluctuation of the diameter of the bubble can be further reduced.

The amount of the supplied pressurized air to be supplied is automatically regulated in accordance with the diameter of the bubble detected by the bubble-diameter detectors 15, 15'. The bubble diameter detectors 15, 15' are a device to measure a distance from the bubble by utilizing a measuring sensor which emits a visible ray, an infrared ray or a laser beam, detects the reflected ray and measures the distance from the reflecting body. The bubble diameter detectors 15, 15' can be set not only under the heater 2 but also outside the heater.

The detectors 15, 15' can detect the distance by receiving the reflected ray passing through a hole formed in the heater 2. In the latter case, distances between the detector and the bubble can be detected at the middle positions of the heater.

An output controller 25 is a device for calculating the diameter of the bubble on the basis of the distance obtained by two or more distance sensors (bubble-diameter detectors 15, 15') and for regulating the opening degree of an air supplying valve 26 in response to the difference between the predetermined bubble diameter and the detected diameter so that the detected diameter accords with the predetermined bubble diameter.

The air supplying valve 26 regulates the flow rate of the pressurized air supplied through a blower 27 by changing the valve-opening degree in response to signals from the output controller 25.

When another bubble diameter detector is provided just above the cut portion and the detected diameter of the lower portion of the bubble is input to the output controller 25, an air supply control where air is supplied in accordance with the difference between the diameters of the upper portion and the lower portion of the bubble or in accordance with an air leak at the cut portion can be carried out.

The group of collapser rolls 4 has a function to gradually collapse the stretched bubble film 3 and to introduce the film to the nip rolls R2. The guide rolls 8, 8' have a function to smoothly introduce the cut-opened flat films 7, 7' toward the drawing nip rolls R3 so that the films are not in contact with the slit-like air injecting nozzle 6 and the cutting knife devices.

The non-stretched film 1 is heated by a ring-like heater 2 provided around the tubular stretched bubble, and is inflated by the air supplied through the nozzle 6.

Where the film is stretched in a longitudinal direction mainly due to a difference between peripheral speeds of nip rolls R1 and R2, the film is biaxial stretched as a result thereof. Of course, monoaxial stretching can be carried out by setting the bubble's diameter to accord with the non-stretched tubular film when interior pressure is applied.

EXAMPLE

Hereinafter, referring to FIGS. 1 through 7, more examples of the apparatus and method for producing stretched films of the present invention are explained. However, the present invention is not limited to those embodiments, without departing from the scope and extent of the present invention.

Before starting, a non-stretched tubular film made of linear low density polyethylene (MI=2.0) 35% by weight of a low molecular weight polyethylene telephthalate (IV=0.25) fine particles were discharged, was passed through nip rolls R1, a group of collapser rolls 4 and nip rolls R2. Then, independently operating the electric motors 11, 11' each connected to rotary shafts 13, 13' separated with each other, cutting knives 5, 5' were adjusted or had been adjusted to a width of the collapsed non-stretched tubular film 1. The tubular film was cut by the adjusted cutting knives 5, 5' into two sheets of flat films 7, 7', and the flat films were drawn by nip rolls R3 through guide rolls 8, 8'.

Next, the non-stretched tubular film 1 was heated by a heater 2, a bubble 3 was formed by supplying pressurized air into the tube from an air injected nozzle 6. Then, nip rolls R1 and R2 located at upper and lower positions were driven, the temperature of the heater 2 was regulated, a ratio of peripheral speeds of the nip roll R1 to the nip roll R2 was set to 0.31 to have a longitudinal magnification 3.2 times. By regulating the pressure of the air, the transverse magnification was set to 2.5 times, so that the simultaneous biaxial stretching was carried out to obtain a gas permeable biaxial stretched film 3. When the stretched film regulated as mentioned above was collapsed and reached the nip rolls R2, the width of the collapsed portion gradually became larger. However, the stretching and cutting open of the film continued smoothly since the positions of the cutting knives 5 were gradually extended by driving the electric motors 11, 11'.

Thereafter, the diameter of the stretched film 3 was kept to an almost constant level by regulating the supplied pressurized air. After the two sheets of stretched flat films 7, 7' cut open at the location of the nip rolls R2 were drawn by the nip rolls R3 through the guide rolls 8, 8', both flat films were wound by two winders, respectively. The obtained biaxial stretched films 3 were gas permeable films and had good flatness. (Example 2)

The same non-stretched tubular film 1 as shown in Example 1 was passed through the rolls and drawn in the same manner as in Example 1. Then, the non-stretched tubular film 1 was heated with a heater 2, and bubble-diameter detectors 15, 15', an output controller 25, an air supplying valve 26, photoelectric switches for cutting positions and relays were operated.

A switch of the heater was switched on, and about one minute after, the switches of the driving motors of nip rolls R1, R2 and R3 were switched on to start stretching. While a bubble is gradually inflated, the opening degree of the air supplying valve was gradually decreased, and about five minutes thereafter, the bubble's diameter accorded with a predetermined value and became stable. During the above-mentioned operation, the cutting knives 5, 5' were extended due to the operation of the photoelectric switches and the relays in relation to the inflation of the bubble. The frequency of switching of the photoelectric switches was then reduced and became stable.

The stretched flat films 7, 7' cut with the knives 5, 5' situated at the position of the nip rolls R2 were wound on the drawing winder in the same manner as in Example 1.

Though the obtained biaxial stretched film 3 was gas permeable, the motion of the valve was stable due to the automatic air supply control, and the cut and wound flat film had a uniform width and a good flatness.

INDUSTRIAL APPLICABILITY

The apparatus for producing a tubular stretch film of the present invention can be continuously operated for a long time with constant stretching magnification without stoppage of the operation, since pressurized air is supplied through a nozzle of a slit-like air injecting device during the operation, and therefore, the bubble can be filled with pressurized air corresponding to the leakage. Further, even where a porous film is produced by stretching a gas permeable tubular film or a film which becomes gas permeable when stretched, the gas permeable stretched film can be produced stably for a long time, since the amount of air corresponding to the leakage of the interior air through the film can be suitably supplied to always keep the bubble's diameter constant.

We claim:

1. A method for producing a stretched film comprising the steps of:
    passing a tubular thermoplastic resin film between pairs of nip rolls having mutually different peripheral speeds, said pairs of nip rolls includes at least three pairs of nip rolls respectively, peripheral speeds of said pairs of nip rolls have a ratio set in a range of 0.1 through 0.8/1/1 through 1.1, a first pair of nip rolls is situated at an introducing side of a non-stretched film, a second pair of nip rolls is situated at a position after said first pair of nip rolls, and a third pair of drawing nip rolls is situated at a position after said second pair of nip rolls;
    admitting pressurized air to said film located between said first and second pair of nip rolls, through a slit-like nozzle inserted between said second pair of nip rolls;
    forming a bubble stretched and inflated by the supplied pressurized air;
    inflating and stretching said bubble at least one time in size in a radial direction while heating said film;
    collapsing said film with a collapser device;
    feeding said collapsed film to said second pair of nip rolls;
    cutting open both side ends of said collapsed film with film cutting knives positioned between said second pair of nip rolls to make two sheets of flat films;
    inputting said flat films to left and right guide rolls so as to avoid interference with said slit-like injecting nozzle and said cutting knives; and
    drawing said films with said third pair of nip rolls.

2. The method for producing a stretched film of claim 1 wherein said tubular thermoplastic resin film is a gas-permeable film.

3. The method for producing a stretched film of claim 1 wherein said tubular thermoplastic resin material is a film which becomes gas-permeable when stretched.

4. An apparatus for producing stretched films comprising:
    at least three pairs of nip rolls respectively, peripheral speeds of said pairs of nip rolls have a ratio set in a range of 0.1 through 0.8/1/1 through 1.1, a first pair of nip rolls is situated at an introducing position of a tubular non-stretched film, a second pair of nip rolls is situated at a position after said first pair of nip rolls, a gap between the second pair of nip rolls is adjustable, and a third pair of drawing nip rolls is located at a position after said second pair of nip rolls;
    a heater heating said introduced tubular film is provided between said first and second nip rolls;
    a collapser device collapsing said film after said film is stretched to form a bubble, is provided between said first and second nip rolls;
    a slit-like nozzle device injecting pressurized air into said bubble and two film cutting knife devices movable in a longitudinal direction of said second pair of nip rolls are provided between said gap in order to cut both side ends of said collapsed film; and
    at least guide roll for guiding said cut film to make a film's path capable of avoiding said slit-like nozzle device and said cutting knife devices for each flat film.

5. The apparatus of claim 4 wherein said film cutting knife devices are provided in a gap of said slit-like air injecting nozzle.

6. The apparatus of claim 4 wherein said film cutting knife devices are situated at both outer sides of said slit-like air injecting device in a direction of said nip rolls.

7. The apparatus of claim 4 further comprising an automatic control device including means for detecting an amount of pressurized air injected from the slit-like air injecting nozzle and a means for detecting a diameter of said bubble, and means for automatically changing the amount of pressurized air a diameter of the bubble in order to eliminate fluctuations in the film.

8. The apparatus of claim 4 further comprising an automatic control device for keeping a diameter of said bubble to an almost constant level in order to eliminate fluctuation of thickness of the film, said control device including means for detecting a diameter of said bubble and means for automatically adjusting a flow rate of pressurized air supplied through said nozzle device in accordance with the detected diameter of the bubble.

* * * * *

UNITED STATES PATENT AND TRADEMARK OFFICE
CERTIFICATE OF CORRECTION

PATENT NO. : 4,983,337  Page 1 of 3

DATED : January 8, 1991

INVENTOR(S) : KOJOH et al

It is certified that error appears in the above-identified patent and that said Letters Patent is hereby corrected as shown below:

On the drawing, sheet 1 of 5, delete "Fig. 1", second occurrence.

Figure 2:
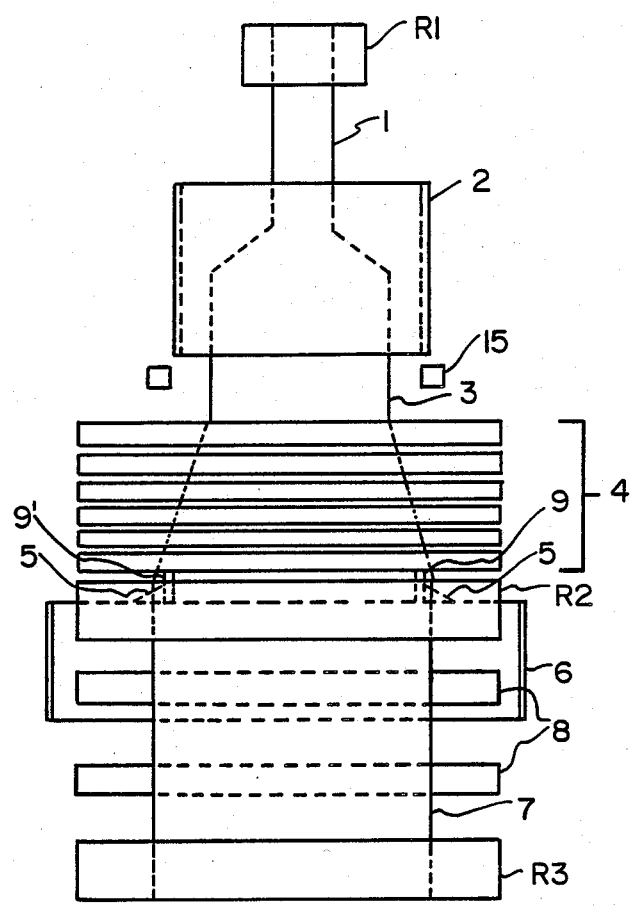
FIG. 2 is a diagrammatic side elevational view showing the apparatus of FIG. 1 where film cutting devices are provided in a gap of a slit-like air injecting device.

On the drawing, sheet 2 of 5, please insert --Fig. 2--, as shown on the attached page.

On the drawing, sheet 5 of 5, delete "Fig. 6" and insert new --Fig. 6--, as shown on the attached page.

Column 7, line 68, after "(MI=2.0)", please insert --wherein--.

Column 8, line 2, delete "discharged" and insert therefor --dispersed--.

Signed and Sealed this

Fifteenth Day of December, 1992

*Attest:*

DOUGLAS B. COMER

*Attesting Officer*  *Acting Commissioner of Patents and Trademarks*